Patented Nov. 3, 1953

2,658,021

UNITED STATES PATENT OFFICE 2,658,021

SINGLE TISSUE CELL CULTURING PROCEDURE

Wilton Robinson Earle, Burtonsville, Md., and Katherine Koontz Sanford, Washington, D. C., assignors to the United States of America as represented by the Administrator of the Federal Security Agency No Drawing. Application November 30, 1949, Serial No. 130,362

1 Claim. (Cl. 167—84.5)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467).

This invention relates to tissue culture procedures and more particularly to improvements therein making possible the production of a massive culture of like living cells, all descended from a common ancestor.

Heretofore, tissue cells have been cultured apart from a living vertebrate animal by embedding an explant in a plasma clot, and then bringing a nutrient solution into contact with the clot while maintaining a temperature condition appropriate to the growth of the cells. More recently, there has been described a method for the growth of tissue cultures under perforated cellophane whereby the plasma clot is no longer necessary. The article in the Journal of the National Cancer Institute, vol. 8, pages 103–119 (1947) by V. J. Evans and W. R. Earle describes the cellophane growth technique in detail. However, for reasons not heretofore known, it was necessary in every case to start the tissue culture with an explant of tissue containing a great number of living cells. By the above-mentioned perforated cellophane technique, the growth of massive tissue cultures could be accomplished uniformly and with reproducible results. However, since a large explant of tissue cells was necessary in order to initiate the growth, it was obvious that the cells forming the ultimate massive culture were descended from a great variety of parents. This follows from the fact that even closely adjacent tissue cells dissected from a single vertebrate animal, are nevertheless differentiated among themselves to some degree. Obviously, in order to, for example, test the therapeutic efficacy of drugs, or to collect the maximum amount of tissue secretory products, it would be highly desirable to propagate a culture or colony of tissue cells from one single cell. Thus, a pure culture could be established and specimens of a pure culture could be replicated for clinical test purposes and the like. By the instant invention, it is now possible to prepare such a pure culture.

This invention, accordingly, has for an object the production of a pure culture of vertebrate animal tissue cells in which all the cells have been formed by proliferation of a single cell. Another object is the production of a massive tissue culture wherein differentiation between the individual cells, in a biological sense, is at an absolute minimum. Another object comprises the preparation and utilization for pharmacological test purposes or the like of replicated tissue cultures upon which test procedures can be applied while at the same time permitting observation of the continued growth of the untested replicates. Other objects will be apparent or will become so as the ensuing description proceeds.

These objects are accomplished in accordance with this invention which provides for the artificial production of a massive culture of biologically complete tissue cells descended from a single ancestor wherein a single living vertebrate animal tissue cell of the biologically complete type is isolated and planted in a restricted body of nutrient solution of such size that the said single cell can physiologically alter said solution and adapt it for proliferation, said restricted body being directly connected with a massive body of nutrient solution previously conditioned by similar cell growth therein, and incubating said connected bodies of nutrient solutions whereby cell proliferation first takes place in the restricted body and thereafter migrates into the massive body.

While this invention is not to be restricted to any particular theory of reaction, it appears from the information presently at hand that in order for a cell to proliferate it must in some fashion metabolize or act upon or otherwise alter the best nutrient solutions now available for growth purposes. In order to proliferate, the cell must be in a body of "conditioned" nutrient solution. The heretofore-known massive tissue explants apparently by virtue of the great number of cells present and by virtue of the restricted diffusion of nutrient solution into the plasma clot, were enabled to condition the nutrient solution or physiologically or chemically or physically alter it in some fashion so as to adapt it for cell proliferation substantially at the rate in which it diffused into the plasma clot. Similarly, under perforated cellophane as described in the literature article supra, the massive tissue explant did not need the plasma clot to restrict diffusion but instead employed the perforated cellophane as a means of limiting or restricting the habitat of the tissue explant so that the living cells therein present could alter and adapt the nutrient solution to cell proliferation substantially at the rate at which it diffused through the perforated cellophane. Obviously, under this explanation, as soon as the tissue culture under the cellophane became sufficiently large in size to enable it to alter or adjust the entire body of nutrient solution introduced into the culture vessel, it then was able to proliferate outside the protection of the perforated cellophane.

Suitable tissue cells for propagation in accordance with this invention include the biologically complete tissue cells from vertebrate animals. Obviously, cells which are inherently incapable of proliferation, such as the mammalian red blood tissue cells known as erythrocytes, known to lack a nucleus, cannot be employed for propagation in accordance with this invention. However, any of the biologically complete tissue cells, such as, for example, the fibroblasts, osteoblasts, and like biologically complete tissue cells, can be employed. Examples of suitable tissue cells include Earle's strain L originating from normal subcutaneous, connective tissue of an adult $C_3H$ strain mouse, subsequently treated with 20-methylcholanthrene and capable of producing sarcomas on injection into normal $C_3H$ strain mice; the normal liver epithelium cells of the mouse, the normal cells of the embryonic chicken heart, and the melanoma cell, which is a pigmented neoplastic cell of the mouse, have all been found suitable for proliferation into tissue culture in accordance with this invention. The $C_3H$ strain mouse has been described in the Journal of the National Cancer Institute, volume IV, page 176 (1943). For practical purposes, suitable important tissue cells include the secretory cells of the so-called endocrine gland system of the human body and of other vertebrate animals. For example, the secretory cells of the posterior and anterior pituitary bodies, thyroid, the cortex of the adrenal gland, the pancreas, the liver epithelium, and the other known endocrine glands, are adapted to be cultured in massive quantities in vitro to provide a standardized and highly potent extract of the products which these cells are known to produce. One will appreciate that the foregoing list of suitable tissue cells for proliferation in accordance with this invention is purely for illustrative purposes and that many other useful undifferentiated tissue cells can similarly be grown from a single common ancestor in accordance with this invention.

A suitable conditioned nutrient medium for employment in accordance with this invention comprises 40% horse serum, 20% chick embryo extract (1:1) and 40% saline (proportioned by volume) as described by W. R. Earle in The Journal of the National Cancer Institute, vol. 4, pages 165-212 (1943). It is important that the culture medium be conditioned by the growth therein of a massive culture of the same or similar tissue cell types for a period of time sufficient substantially to alter or adapt the nutrient medium to the proliferation of cells of the general type sought to be proliferated. In general, the fluid culture medium is altered by growing therein about 1% by volume of a similar tissue cell type for a period of about 24 hours; thereafter, the growing tissue cells employed for the alteration or conditioning are removed and the sterile culture medium, described herein as "conditioned medium" or "growth solution," is adapted for cell proliferation of a minor quantity or a single cell. Preferably, the thus-conditioned culture medium is fortified with a quantity of sterile glucose solution to a concentration of 100 mg. glucose per 100 cc. of culture medium, in order to provide for metabolic losses of this nutrient element during the conditioning period.

In the growth of a single tissue cell of the type above described into a massive tissue culture in accordance with this invention, it has been found that one single cell can alter for its own proliferation purposes about 100 times its volume of nutrient medium. Generally, between about 50 vols. of nutrient solution and about 500 vols. thereof, can be altered by a single cell (based on cell volume) so as to allow proliferation to take place therein. Clearly, when one employs conditioned nutrient medium as above described, larger quantities of nutrient culture medium can be altered by the single cell.

A suitable environment for securing a restricted body of conditioned nutrient solution for the initial early division of cells from a single cell planted, is to plant the cell in a capillary tube having an internal diameter of about 0.1 to 0.2 mm. and to place this capillary containing the single cell in a flask or other receptacle containing a large portion of conditioned culture medium whereby initial proliferation takes place in the capillary tube and migration of the cells therefrom into the large body of conditioned nutrient medium follows during growth. For example, a sheet of perforated cellophane, as described in the Evans and Earle literature citation, supra, is employed over the capillary tube so as to restrict diffusion of nutrient medium about the open end of the capillary tube during initial stages of cell emergence from the tube. The following example illustrates the practice of this invention in the growth of a massive cell culture from a single cell.

A micropipette was prepared having an internal diameter of about 0.1 mm. and a lengh of about 100 mm. plus an enlargement of about 25 mm. of 2.8 mm. in outside diameter. The inside of the micropipette was flushed with chicken plasma directly before isolation of a cell in order to provide a thin layer clot to which the isolated cells could anchor themselves. An actively growing culture of Earle's strain L, a particular type of tissue utilized in the tissue culture art, originated from the connective tissue of a mouse, as described in the Journal of the National Cancer Institute, vol 4, pages 165-212 (1943), was suspended in culture fluid under a dissecting microscope and a single cell was sucked into the pipette. A bubble of air was next introduced under sterile conditions, and, finally, a small amount of plasma clot mixture prepared by mixing one drop of culture medium with one of chicken plasma. The capillary tube was then broken from the base of the pipette. The proximal end of the capillary tube was then sealed with a small molten glass bead and thereafter the distal end containing clotted plasma was similarly sealed. The sealed tube was then incubated at 37.5° C. for 15 to 20 hours, after which it was mounted in oil on a slide, examined microscopically, and one or several cells were seen to be distributed along the length of the capillary tube. The location of the well-isolated healthy single cells was measured from one reference end of the capillary tube and thereafter the outside of the sealed capillary tube was sterilized by immersing in chloroform for 15 minutes. Under sterile conditions, a section of capillary tube 4 to 5 mm. long containing the selected cell was cut from the length of the tubing and inserted into a Carrel D 3.5 flask containing 0.5 ml. chicken plasma and 0.5 ml. conditioned culture fluid above described. Carrel D 3.5 flasks and other flasks suitable for tissue culture are described on page 21 of the book entitled "Methods of Tissue Culture" by Parker, published in 1938 by Paul B. Hoeber, Inc. The customary gassing of the culture media with carbon dioxide and air is described on page 104 of the same text. The capillary tube was oriented in the middle of the flask and after gassing with the usual 5% carbon dioxide in air mixture known to those skilled in the art, the flask was sealed and incubated at 37.5° C. Subsequent observation established that the cell divided and ultimately the produced colony of tissue cells migrated out of the capillary into the plasma clot and thence into a diffused culture. The conditioned growth medium was changed at intervals of several days as is known to those skilled in the art.

In another embodiment, instead of mounting the capillary tube in chicken plasma in the Carrel flask, the capillary tube was merely oriented in the flask under a sheet of perforated cellophane and the growing culture attached itself to the underside of the perforated cellophane as soon as it emerged from the capillary tube.

It will be seen from the foregoing that by the employment of a suitably conditioned nutrient medium, tissue cells may freely proliferate outside of the confines of a plasma clot, and even outside of a cellophane sheet. Apparently, even the best of nutrient media must be physically or chemically altered in some fashion by the growing tissue cells themselves in order to permit cell proliferation therein. Where the above-described capillary tube was immersed in a normal unconditioned growth medium, the tissue cells proliferated within the confines of the capillary but failed in general to establish themselves outside the capillary. Seemingly, the rate of diffusion and the quantity of nutrient solution was so large in relation to the quantity of cells growing therein that it was impossible for the cell colony to establish itself in massive form.

It will be seen that by the practice of this invention it is now possible to establish massive tissue cultures of like cells undifferentiated between each other and all descended from a single selected cell of origin. Thus, certain strains of cells best adapted to the secretion of hormones and the like can be isolated from their nonproductive neighbors and separately cultured.

Pure cell strains produced in accordance with this invention may also be used as host cells in cultivation of parasitic protozoa, viruses and the like, in high yield and in great purity.

Since many apparently differing embodiments of this invention will occur to one skilled in the art, it is obvious that various changes can be made without departing from the spirit and scope thereof as defined in the claimed subject matter in this application.

We claim:

A process for the artificial production of a massive culture of biologically complete tissue cells descended from a single ancestor, which comprises isolating a single living biologically complete tissue cell which reproduces by cell division, planting the same in a restricted body of nutrient solution of about 50 to 500 volumes, based upon the volume of said isolated cell, said nutrient solution having been previously conditioned by the growth therein of a large mass of similar tissue cells, said restricted body of nutrient solution being directly connected with a massive body of similarly conditioned nutrient solution, and incubating said connected bodies of nutrient solutions, whereby cell proliferation is initiated in the restricted body and thereafter continues in the massive body.

WILTON ROBINSON EARLE.
KATHERINE KOONTZ SANFORD.

References Cited in the file of this patent

UNITED STATES PATENTS

| Number | Name | Date |
|---|---|---|
| 994,660 | Schmidt | June 6, 1911 |
| 2,239,345 | Sperti | Apr. 22, 1941 |
| 2,255,079 | Morrison | Sept. 9, 1941 |
| 2,268,955 | Meier | Jan. 6, 1942 |
| 2,320,479 | Sperti | June 1, 1943 |
| 2,349,294 | Morrison | May 23, 1944 |

FOREIGN PATENTS

| Number | Country | Date |
|---|---|---|
| 534,454 | Great Britain | Mar. 7, 1941 |

OTHER REFERENCES

"Tissue Culture Technique," by Cameron, published 1950 by Academic Press Incorporated, New York city. Pages 1, 67, 90, 91 and 99 to 102.

Serial No. 368,731, Fisher (A. P. C.), published May 11, 1943.